Aug. 5, 1952
J. A. POTTER
2,606,314
REGULATED RECTIFIER
Filed Oct. 11, 1949
2 SHEETS—SHEET 1
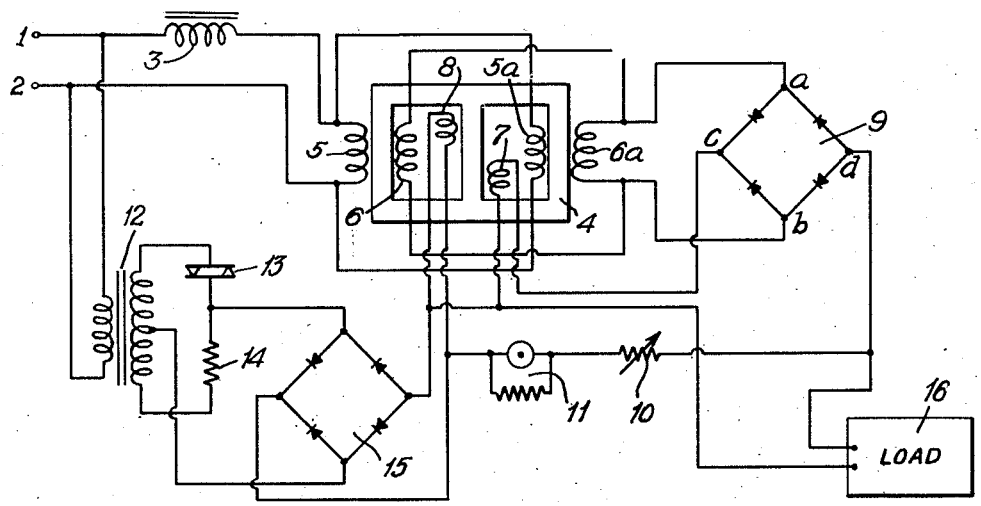
*Fig:1.*
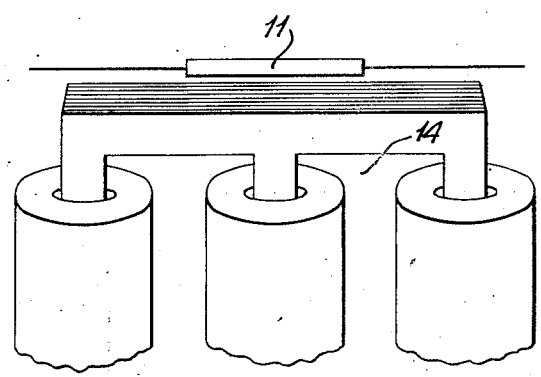
*Fig:2.*
INVENTOR
JAMES ADDISON POTTER
BY
*G. F. Heuerman*
ATTORNEY

INVENTOR
JAMES ADDISON POTTER
ATTORNEY

Patented Aug. 5, 1952

2,606,314

UNITED STATES PATENT OFFICE 2,606,314

REGULATED RECTIFIER

James A. Potter, Rutherford, N. J., assignor to Bell Telephone Laboratories, Incorporated, New York, N. Y., a corporation of New York Application October 11, 1949, Serial No. 120,747

18 Claims. (Cl. 321—19)

The present invention relates generally to rectifier systems, and more particularly to rectifier systems adapted to provide compensation for voltage variations induced by changes in operation conditions. Heretofore, in circuits providing rectification of alternating currents, variations of the supply voltage, the attached load, and the ambient operating temperature of the rectifying equipment contribute to cause undesired change of the unidirectional output voltage of the rectifier system.

According to the invention, there is provided a saturable transformer having primary and secondary windings; the reluctance of the transformer core is caused to vary by introduction of a direct current flux therein. Current from an alternating current supply source is supplied through a ballast reactor to the primary windings of this transformer, and the secondary windings are connected to a rectifier. The direct current flux found in the core of the transformer is made to be in part dependent upon the load current. Another component of direct current flux is derived from the output voltage of the rectifier and a resistance sensitive to changes in the ambient temperature. An auxiliary rectifier derives a compensating voltage from the supply source responsive to line voltage changes; the compensating voltage varies the magnetomotive relationships of the transformer. Objects of the invention are to provide automatic compensation for changes in load, supply voltage and ambient air temperature, as well as to protect the rectifier system from damage caused by the possible application of excessive load.

According to one embodiment of the invention, described for the sake of illustration, a saturable transformer is employed, having a plurality of parallel magnetic paths. On two of the magnetic paths are primary and secondary windings of the transformer and means are employed to induce in the core a magnetization dependent upon the variable external parameters for which compensation is sought. For example, the external parameters of load current and voltage are applied in the form of direct currents to magnetizing windings which cause opposite magnetomotive forces to be developed in the core. The changes in core magnetization will alter the inductance of the primary transformer winding. An external reactance in series with the transformer primary provides a variable division in the supply voltage applied to the series combination in accordance with the change in transformer primary inductance.

Rectifiers, where indicated, may be of any convenient type; metallic rectifiers, thermionic discharge or vacuum tubes, or the like.

The objects of the invention may be realized by the means described in detail by the following specification:

Fig. 1 is a schematic diagram of one embodiment of the invention;

Fig. 2 is a partial view showing the structural arrangement of a portion of the circuit according to the invention;

Figure 3:
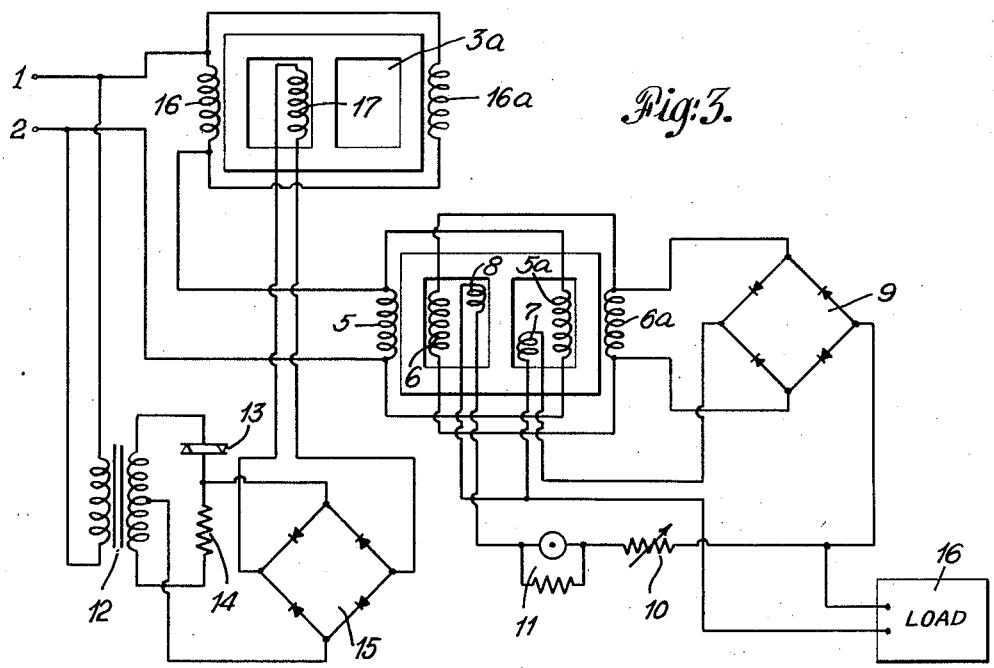
Fig. 3 shows a schematic diagram of a further embodiment of the invention.

Referring first to Fig. 1, a source of alternating current is supplied to terminals 1 and 2. In series with the terminal 1 is an inductance 3. A transformer 4 is employed, having three-core legs and, therefore, two-core windows or openings. Two primary and two secondary windings are respectively intercoupled to the two outer core legs of the transformer. The primary windings 5 and 5-a of the transformer 4 are connected together in parallel and to the terminals 1 and 2 in series with the inductance 3. The two secondary windings, 6 and 6-a, of the transformer 4, are connected together in parallel and coupled to the input vertices of rectifier bridge 9. The rectifier bridge 9 is shown as being composed of a group of unidirectional conductors connected in a well-known circuit. If an alternating potential is applied between the rectifier bridge vertices $a$ and $b$, a unidirectional output voltage will be derived at vertices $c$ and $d$. An auxiliary winding 7, magnetically linked to the center core leg of transformer 4, is connected in series with one of the output leads of the rectifier bridge 9. Still another auxiliary winding 8, also magnetically linked to the center leg, is connected in series with rheostat 10 and thermistor 11, the combination being in parallel with the output of the bridge rectifier. Windings 7 and 8 will be called the "series" and "shunt" windings respectively, because of their relation to the rectifier output. The useful load 16 is connected across the output of the bridge rectifier 9 in parallel relation with the shunt winding 8, and in series with the series winding 7.

In order that the operation of the circuit so far described may be understood, analysis must be made of transformer 4. Transformer 4 is a saturable transformer; it translates energy from primary windings 5 and 5-a to secondaries 6 and 6-a through the electro-magnetic coupling paths offered between the primary and secondary windings. The reluctance of the magnetic path coupling the primaries and secondaries depends, however, upon an additional parameter introduced by the two auxiliary windings 7 and 8. Upon inspection of the circuit employed, it is obvious that each of the auxiliary windings 7 and 8 have a unidirectional current flowing therein. The current flow through series winding 7 is dependent upon the load current; the current through shunt winding 8 is dependent upon the value of the rectifier output voltage presented to the load. The fluxes resulting from the current flow through windings 7 and 8 respectively, will be unidirectional and are arranged to be opposed.

Assuming a no-load condition, current will flow through shunt winding 8 only. The flux induced by the direct current in the shunt winding 8, being unidirectional, will extend the magnetic operation of the transformer core toward the upper portion of the hysteresis or magnetization curve; the transformer core will therefore approach saturation. As the transformer approaches saturation, the core reluctance will increase. Increase in core reluctance will decrease the alternating flux due to the currents flowing in the primary windings, thus reducing the secondary voltage. In addition, the inductive reactance of the primary windings will be decreased.

Inasmuch as the series winding 7 produces a flux in opposition to that of winding 8, as the load draws current, the total flux in the core of transformer 4 will be reduced. The reduction in unidirectional or direct current flux produces effects opposite to those just described; i. e., the secondary voltage will rise and the primary winding inductive reactance will increase. The rise in secondary voltage will assist in overcoming the voltage drop occurring as the load draws a heavier current. Further, it is obvious that a drop in rectifier output voltage will reduce the reluctance of the core and increase the secondary voltage of transformer 4 accordingly to compensate for the decrease in rectifier output voltage. In effect, the linkage between the primaries and secondaries of transformer 4 can be controlled by the current flow through the auxiliary windings 7 and 8.

Additional compensation is provided by utilization of the varying primary inductive reactance of transformer 4. As the operation of the transformer core extends over the various portions of the core magnetization curve, the measurable inductance of the transformer primaries 5 and 5-a will vary in accordance with the current passed through the auxiliary windings as previously described. Assuming that the inductance of 3 remains substantially constant, the changes in the value of inductance of the primaries of the transformer 4 will produce changes in primary voltage; the primaries and inductance 3 are connected in series across the line and will share input voltage in accordance with their respective reactance and impedance. The changes in voltage applied to the primary will reflect, in turn, varying secondary voltages of transformer 4 in accordance therewith. Again, these changes depend ultimately upon the current of the auxiliary windings 7 and 8, and, for example, the secondary voltage may be made to increase as the load increases or as the rectifier output voltage decreases. Optimum operation has been obtained when inductance 3 is designed to be approximately fifty per cent larger in magnitude than the inductive reactance presented by the primaries 5 and 5-a of transformer 4, although operation is successful at many ratios of reactance of elements 3 and 4.

By adjustment of the rheostat 10, control of the current through the shunt winding 8 may be exercised and the output voltage of the bridge rectifier 9 may be set at a predetermined value.

The net result described is analogous to a "load compounding" effect; voltage regulation for increase in load can be obtained up to the point that the currents in the series and shunt auxiliary windings 7 and 8, respectively, produce substantially equal and opposite magnetomotive forces. A further increase in load beyond this point will now increase the saturation, as the flux due to the series winding 7 exceeds the flux due to the shunt winding 8 and tends to reduce the output voltage of the bridge rectifier 9, causing an approximately "constant current" type of regulation. Constant current regulation means that the voltage will be depressed to an extent tending to maintain the output current at a constant value. This reaction can be used to accomplish that part of the object of the invention seeking to prevent overloading of the rectifier circuit resulting from heavy current demands by the load.

Considering now compensation for line voltage variations, a second transformer 12 is connected across the alternating current line at terminals 1 and 2. The secondary of transformer 12 is center-tapped and has between its two end terminals a series connection of a non-linear resistance 13 made of a material such as thyrite, and a conventional linear resistance 14. A secondary voltage is developed at transformer 12, having a value proportional to the alternating current line voltage at terminals 1 and 2. The two halves of the secondary of transformer 12 form two arms of the bridge and the linear and non-linear resistances 14 and 13 form the other arms. The output vertices of this bridge are the mid-point or common terminal of the secondary of transformer 12 and the junction point of the linear resistance 14 and the non-linear resistance 13. These output vertices are connected, in turn, to a rectifier bridge 15.

As line voltage changes occur between terminals 1 and 2, a proportional voltage change occurs across the secondary of transformer 12. This varying voltage will, in turn, vary the voltage applied to the non-linear and linear resistances 13 and 14. As this applied voltage increases or decreases, the voltage across the non-linear resistance 13 will increase or decrease respectively, by a non-linear amount through the inherent change in resistance in this circuit element. As a result, the division of the secondary voltage between resistances 13 and 14 will vary and there will be impressed upon the output vertices of the bridge, a voltage equal to the difference between the voltage across one-half of the secondary of transformer 12 and the voltage across the non-linear element. This difference in voltage changes at a rate greater in magnitude than the corresponding causative change of line voltage. The net effect is to provide an "amplified" change reflecting the variations of the alternating current line voltage. In turn, this amplified change is rectified by the bridge rectifier 15 and thence supplied to the shunt auxiliary winding 8.

Considering the operation of the line voltage compensation circuit, an increase, for example, of the line voltage across terminals 1 and 2 will produce a decreased direct current voltage at the output of bridge rectifier 15. The total current through the shunt coil 8 is the difference of the current flow due to the output of rectifier 9 less the current flow due to the opposing voltage derived from rectifier 15. A decrease in the output of rectifier 15 increases the total current through coil 8. The resulting increase in direct current flux density will thereupon lower the output voltage of the secondary of transformer 4 in the manner previously described. The output voltage of the secondary of transformer 4 is thus to be adjusted to a value compensating for the increase in line voltage. Similarly, a decrease in line voltage reduces the direct current flux density and the secondary voltage of transformer 4 will vary to compensate for the decrease in line voltage.

Referring now to Fig. 2, the thermistor 11, previously alluded to, is best located structurally with respect to the transformer 4 in such a way that changes in the ambient operating temperature of the transformer 4 will change the magnitude of the resistance of the thermistor 11. Ordinarily, the thermistor 11 will have a negative temperature coefficient. When the change in the value of thermistor 11 is considered in the light of the circuit employed, it will be seen that changes in ambient temperature result in changes of the current flowing through the shunt winding 8, increasing or decreasing the output voltage of the bridge rectifier 9 in accordance with the change in ambient temperature of air surrounding transformer 4. Compensation may thus be made for changes occurring in the ambient temperature, thereby further stabilizing the output voltage. Other locations for the thermistor 11 have been found satisfactory.

For example, the thermistor 11 is assumed to have a negative temperature coefficient and a rise in temperature will decrease the resistance of the thermistor. Uncompensated, an ambient temperature rise will affect the accuracy which the transformer 4 will achieve in the control of rectifier output. Assuming that an uncompensated increased ambient temperature would cause the controlled output of the rectifier to rise in magnitude, the depressed resistance of thermistor 11 resultant from the increase in temperature will increase the current through winding 8, reestablishing the accuracy of the transformer.

In the modification shown in Fig. 3, circuit elements analogous to the elements of Fig. 1 are similarly numbered. The operation of saturable transformer 4 is as with the corresponding transformer indicated in Fig. 1. Compensation for variations in load current and the output voltage of bridge rectifier 9 is achieved as in the manner of the circuit of Fig. 1. However, according to the embodiment of the invention shown in Fig. 3, compensation is made for variations in line voltage without resort to changes in the reluctance of the core of transformer 4.

In lieu of reactor 3, a saturable reactor 3–a is employed. One possible form of construction for this saturable reactor comprises a three-legged core, two reactance windings 16 and 16–a being symmetrically displaced about the outer legs of the core. These windings are connected to each other in parallel, the parallel combination connected in series with the primary windings of transformer 4 across the supply line terminals 1 and 2. An alternating flux will be induced in the reactor core by windings 16 and 16–a. A third and auxiliary coil 17 is coupled to the center leg of the reactor.

The operation and structure of transformer 12, the non-linear and linear resistances 13 and 14 respectively, and the bridge rectifier 15 are as previously indicated with reference to Fig. 1. However, the direct current voltage derived from the output of bridge rectifier 15 reflecting variations of the alternating current supply line voltage is applied, according to this modification, to the winding 17 of reactor 3–a. Thus, a direct current flows in winding 17, which is a function of supply line voltage variations. Changes in the direct current flux induced in the core of reactor 3–a by winding 17 are reflected to coils 16 and 16–a, causing therein variations in measurable inductive reactance.

As before, the primary windings 5 and 5–a of transformer 4 are connected in series with the reactor. However, the reactor 3–a has been shown to have varying inductive reactance as well as the primaries of transformer 4. While variations in load current and load voltage will produce compensating changes in the inductive reactance of the primaries of transformer 4, line voltage variations in the circuit of Fig. 3 find compensation in the changes in the inductive reactance reflected by windings 16 and 16–a of reactor 3–a. For example, the resistances 13 and 14 and rectifier 15 are connected so that an increase in line voltage will diminish the output of bridge rectifier 15, resulting in a decrease in the direct current magnetization of the saturable reactor. This, in turn, increases the inductive reactance of windings 16 and 16a of the saturable reactor 3–a, altering the ratio of supply line voltage between the reactor 3–a and transformer 4. The increased reactance of 3–a causes a higher ratio of voltage to be applied to the reactance, lowering the voltage supplied to the primary of transformer 4. Similarly, a decrease in line voltage will decrease the ratio of supply voltage to the reactor and increase the voltage presented to the primaries of transformer 4; compensation is made for the supply line voltage change.

The operation of the thermistor 11 and the output voltage control rheostat 10 are as indicated with reference to the circuit shown in Fig. 1.

In the modification shown in Fig. 4, the basic operation of the saturable transformer 4–a is analogous to that described with reference to Figs. 1 and 3. The construction of transformer 4–a differs from that of 4 in that an additional auxiliary coil is coupled to the center leg. The alternating current supply line is again connected in series with reactor 3 and the primary windings 5 and 5–a of saturable transformer 4–a. The secondaries 6 and 6–a of transformer 4–a are connected to each other in parallel and to the primary winding 18 of transformer 21 in series with the primary of a current transformer 22.

Transformer 21 has a secondary winding 19 and a tertiary winding 20. Secondary winding 19 of transformer 21 is used to supply current to the useful load and is connected to the input vertices of bridge rectifier 9; the load is connected to the output vertices of bridge rectifier 9. Tertiary winding 20 of transformer 21 is center-tapped, its end terminals being connected respectively to the anodes of grid-controlled rectifiers 23–a and 23–b.

Rectifiers 23–a and 23–b may conveniently be of the thermionic discharge or vacuum tube type. Tertiary winding 20 in conjunction with the grid-controlled rectifiers 23–a and 23–b form a full wave rectification circuit supplying direct current voltage to an auxiliary winding 8–a. Winding 8–a of saturable transformer 4–a corresponds to the shunt auxiliary winding 8 in Fig. 3. The output of the full wave rectifier, developed between the junction of the cathodes of rectifiers 23–a and 23–b and the center tap of the tertiary winding 20 is applied first across the series connection of a varistor 24 and a capacitance 25, and thence to the auxiliary winding 8–a in series with a rheostat 10 and a thermistor 11. The varistor 24 has substantially no resistance to the passage of current in a given direction known as the "forward resistance," and a high resistance to the passage of current in an opposite direction known as the "back" resistance. Such a circuit element employing selenium or copper oxide, for example, is well known. The junction of the varistor 24 and the capacitance 25 is coupled to the control grids of rectifiers 23–a and 23–b.

The secondary of transformer 22 is coupled through a rheostat 26 to the input vertices of a bridge rectifier 27; the output vertices of bridge rectifier 27 are connected to auxiliary winding 7 on the center leg of the saturable transformer 4–a.

Auxiliary winding 7 is comparable to the series winding 7 of Figs. 1 and 3. A line voltage compensation system employing a transformer 12, non-linear and linear resistance elements 13 and 14 respectively, and a bridge rectifier 15 is connected to the incoming line terminals 1 and 2 as indicated with reference to Figs. 1 and 3. The voltage derived from the output vertices of bridge rectifier 15, representing correction for line voltage variation, is supplied to a third auxiliary winding 8–b in the center leg of saturable transformer 4–a. Otherwise, the operation of the circuit is as described with reference to Fig. 1.

Figure 4:
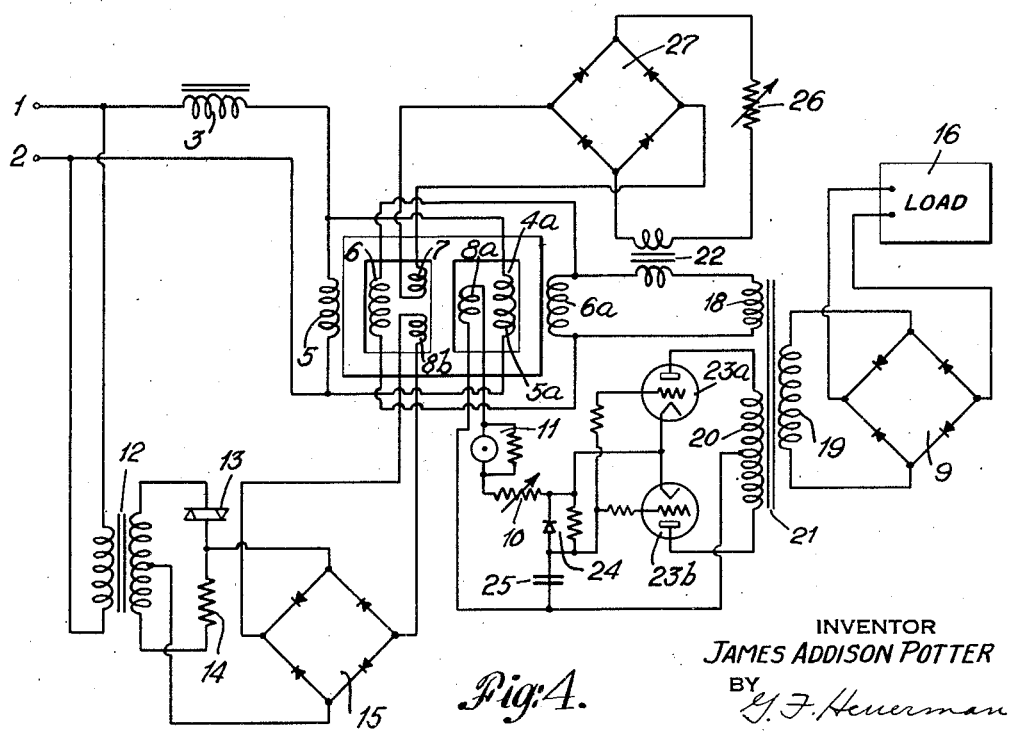
Fig. 4 shows a schematic diagram indicating a still further embodiment of the invention.

Considering now the operation of the circuit shown in Fig. 4, the fluxes developed by auxiliary windings 7 and 8–a are comparable to those developed in series and shunt windings 7 and 8 in Figs. 1 and 3. The reactor 3 is in structure and function as in the circuit shown in Fig. 1.

The tertiary winding 20 of transformer 21 will reflect changes in the voltage supplied from the secondaries 6 and 6–a of saturable transformer 4–a to the bridge rectifier 9. A proportional compensating direct current voltage will be developed through the full wave rectifiers 23–a and 23–b. Assuming that the voltage between the center tap of the tertiary winding 20 of transformer 21 and the junction of the cathodes of rectifiers 23–a and 23–b is constant, capacitance 25 becomes charged to this voltage under steady state conditions through the varistor 24. As a result, the voltage across varistor 24 is normally at zero, and the grids of rectifiers 23–a and 23–b will therefore be at zero potential with respect to their cathodes. As variations are presented to the tertiary winding 20 of transformer 21–a resulting from load changes or other disturbances, the output of rectifiers 23–a and 23–b will vary. A sudden drop in voltage indicating a full or partial load short-circuit will cause the condenser 25 to discharge through the varistor 24. This discharge will be rapid; the varistor has its low or forward resistance to the passage of current tending to discharge the capacitance 25. As the voltage is restored by elimination of the load short-circuit or by the compensation afforded by the regulatory system heretofore described, the output of the rectifiers 23–a and 23–b will again rise. However, the back resistance of the varistor is high with regard to currents tending to charge capacitance 25. During the period of time required to charge capacitance 25 through varistor 24, a voltage is impressed between the grid and cathode of the rectifiers 23–a and 23–b. This voltage is negative with respect to the grid, reducing the current output of rectifiers 23–a and 23–b, and will decay in a time equal to the charging time of the capacitance 25.

Otherwise than the electronic time lag provided by the varistor 24 and its associated circuit, the compensation for load voltage changes obtained by control of the current through the auxiliary winding 8–a is comparable to the compensation achieved by the shunt winding 8 in the circuit of Fig. 1.

As in the previous circuits, rheostat 10 provides a control for obtaining the desired output voltage from rectifier 9. The thermistor 11 will compensate for changes in ambient temperature as indicated with reference to the circuit of Fig. 1.

Changes in output load current will be reflected back through the secondary winding 19 to the primary winding 18 of transformer 21. In turn, such current variations will appear in the series-connected primary of current transformer 22. These changes will also be reflected in the secondary of current transformer 22, ultimately resulting in a voltage to be derived from the output vertices of bridge rectifier 27 and supplied to the series auxiliary winding 7. As before, auxiliary winding 7 is in magnetomotive opposition to shunt auxiliary winding 8–a; compensation for load changes is achieved in a manner otherwise similar to the circuit shown in Fig. 1. The regulatory effect to be obtained from manipulation of the current through winding 7 is controlled by adjustment of rheostat 26.

The control voltage derived from rectifier 15 and its associated elements provides compensation for line voltage changes. However, the control voltage is shown as being applied to a third control winding 8–b of transformer 4–a. The operation, however, is as previously described in relation to Figs. 1 and 3.

The circuit shown in Fig. 4 will allow operation of a saturable transformer to regulate voltage independently of internal operating changes occurring in the rectifier 9.

Although only a few forms of rectifying apparatus according to the invention are shown and described, it is understood that various changes and modifications may be made therein without departing from the spirit of the invention and within the scope of the appended claims.

It is obvious that the scope of the invention is not limited to the specific embodiments described, and that the invention may be employed in arrangements other than those given by way of example.

What is claimed is:

1. A regulatory electric circuit arrangement for rectifying a source of alternating current to be supplied to a load comprising, a reactor, a transformer having a core, a primary, a secondary and a plurality of direct current windings, means to couple the primary of the said transformer to the source of alternating current through the said reactor, means for connecting the secondary of the said transformer to the input of the rectifier, means to derive a first unidirectional control voltage responsive in amplitude to the load current of the rectifier, means to apply the said first control voltage to one of the said plurality of direct current windings of the said transformer to set up a first magnetomotive force in said core, means to derive a second unidirectional control voltage responsive in amplitude to changes in the load voltage of the rectifier, means to apply the said second control voltage to a second direct current winding of the said transformer to set up in said core a second magnetomotive force opposed to said first magnetomotive force, means to derive a third unidirectional control voltage responsive in amplitude to changes in the supply line voltage, and means to vary the ratio of reactive magnitudes of the said reactance and the primary of the said transformer in accordance with the said third control voltage.

2. A regulatory electric circuit arrangement for rectifying a source of alternating current to be supplied to a load comprising, a reactor, a transformer having a core, a primary, a secondary and a plurality of direct current windings, means to couple the primary of the said transformer to the source of alternating current through the said reactor, means for connecting the secondary of the said transformer to the input of the rectifier, means to derive a first unidirectional control voltage responsive in implitude to the load current of the rectifier, means to apply the said first control voltage to one of the said plurality of direct current windings of the said transformer, means to derive a second unidirectional control voltage responsive in amplitude to changes in the load voltage of the rectifier, means to apply the said second control voltage to a second direct current winding of the said transformer, the magnetomotive forces set up in said core due to currents in said first and second direct current windings, respectively, being opposed, means to derive a third unidirectional control voltage responsive in amplitude to changes in the supply line voltage, and means to modulate the magnetic core flux of the said transformer in accordance with the said third control voltage.

3. The combination with a rectifier for rectifying current supplied thereto from an alternating current supply source and for supplying the rectified current to a load, of a reactor, a transformer having a magnetically saturable core, a primary, a secondary and a plurality of direct current windings, a series-connection of the said reactor and the primary winding of the said transformer, means to couple the said latter series-connected reactor and primary winding to the source of alternating current, means for connecting the secondary of the said transformer to the input of the rectifier, means for setting up a first unidirectional control voltage proportional to the current supplied to the rectifier, means for impressing said control voltage upon one of the direct current windings of the said transformer to produce a magnetomotive force in said core, means for setting up a second unidirectional control voltage responsive in amplitude to changes in the supply voltage and to the operating voltage of the said rectifier, and means for impressing said control voltage upon a second of said direct current windings of the said transformer to produce a magnetomotive force in said core opposed to the first magnetomotive force.

4. A combination in accordance with claim 3 in which are provided means for minimizing load voltage changes due to ambient temperature changes comprising a resistance element having a temperature responsive characteristic, and means to couple the said resistance element to one of the plurality of direct current windings for controlling the current supplied thereto.

5. The combination with a rectifier for rectifying current supplied thereto from an alternating current supply source and for supplying the rectified current to a load, of a reactor, a transformer having a magnetically saturable core, a primary, a secondary and first and second direct current windings, means to couple the primary of the said transformer to the source of alternating current through said reactor, means for connecting the secondary of the said transformer to the input of the rectifier, means to connect the first direct current winding of the said transformer in series with the load to the output of the rectifier, means to connect the second direct current winding of the said transformer in parallel with the load to the output of the rectifier, the magnetomotive forces resultant from the currents supplied to the first and second direct current windings respectively, of the said transformer being opposed, means to derive a unidirectional control voltage responsive in amplitude to changes in the supply line voltage, and means to modulate the magnetic core flux of the said transformer in accordance with the said third control voltage.

6. A combination in accordance with claim 5 in which there is provided means for minimizing load voltage changes resulting from ambient temperature changes comprising a resistance element having a negative temperature coefficient, and means to connect the said resistance element in series with the second direct current winding of the said transformer.

7. In a rectifier arrangement having a current supplied thereto from an alternating current supply source and for supplying the rectified current to a load, a reactor, a transformer having a magnetically saturable core, a primary, a secondary and first and second direct current windings, means to couple the primary of the said transformer to the source of alternating current through said reactor, means for connecting the secondary of the said transformer to the input of the rectifier, means for connecting the first direct current winding of the said transformer in series with the load to the output of the rectifier, means to derive a control voltage responsive to amplitude changes of the alternating supply source, and means to connect the second direct current winding of the said transformer in parallel with the load and with the said derived control voltage, the magnetomotive forces resultant from the currents supplied to the first and second direct current windings of the said transformer being opposed.

8. In a rectifier arrangement having a current supplied thereto from an alternating current supply source and for supplying the rectified current to a load, a reactor having a magnetically saturable core, an impedance winding and a direct current control winding, a transformer having a magnetically saturable core, a primary, a secondary and first and second direct current windings, means to couple the primary of the said transformer to the source of alternating current through the impedance winding of the said reactor, means for connecting the secondary of the said transformer to the input of the rectifier, a connection of the first direct current winding of the said transformer in series with the load to the output of the rectifier, a connection of the second direct current winding of the said transformer in parallel with the load to the output of the rectifier, the magnetomotive forces resultant from the currents supplied to the first and second direct current windings of the said transformer respectively, being opposed, means to derive a control voltage responsive in amplitude to changes in the magnitude of the alternating supply source, and means to impress said derived control voltage upon the direct current control winding of the said reactor.

9. In a rectifier arrangement having a current supplied thereto from an alternating current supply source and for supplying the rectified current to a load, a reactor, a transformer having a magnetically saturable core, a primary, a secondary and first and second direct current windings, means to couple the primary of the said transformer to the source of alternating current through said reactor, means for connecting the secondary of the said transformer to the input of the rectifier, means for connecting the first direct current winding of the said transformer in series with the load to the output of the rectifier, means to derive a control voltage responsive in amplitude to changes in the magnitude of the alternating supply source, a resistance element having a negative temperature coefficient of resistance, and means to connect the second direct current winding of the said transformer in series with the said resistance element of the output of the rectifier and to said derived control voltage, the magnetomotive forces resultant from the currents supplied to the first and second direct current windings respectively, of the said transformer, being opposed.

10. In a rectifier arrangement having a current supplied thereto from an alternating current supply source and for supplying the rectified current to a load, a reactor having a magnetically saturable core, an impedance winding and a direct current winding, a transformer having a magnetically saturable core, a primary, a secondary and first and second direct current windings, means to couple the primary of the said transformer to the source of alternating current through the impedance winding of the said reactor, means for connecting the secondary of the said transformer to the input of the rectifier, means for connecting the first direct current winding of the said transformer in series with the load to the output of the rectifier, a resistance element having a negative temperature coefficient of resistance, means for connecting the second direct current winding of the said transformer in series with the said resistance element to the output of the rectifier, the magnetomotive forces resultant from the currents supplied to the first and second direct current windings of the said transformer respectively, being opposed, means to derive a control voltage responsive in amplitude to changes in the magnitude of the alternating supply source, and means to supply the derived control voltage to the direct current control winding of the said reactor.

11. In an electric power supply arrangement adapted to supply direct current to a load, a source of alternating current, a reactor, a first transformer having a magnetically saturable core, a primary, a secondary, and a plurality of direct current control windings, means to couple the primary of the said first transformer to the said source of alternating current through the said reactor, a second transformer having a primary and two secondary windings, means to couple the secondary and primary windings of the said first and second transformers respectively, a first rectifier, means to couple one of the secondary windings of the said second transformer to the load through the said rectifier, means to derive a first unidirectional voltage responsive in magnitude to the current through the primary winding of the said second transformer, means to apply the said derived first unidirectional control voltage to one of the direct current control windings of the said first transformer, means to derive a second unidirectional control voltage responsive in amplitude to changes in the magnitude of the alternating current supply source, means to modulate the magnetic core flux of the said first transformer in accordance with said second control voltage, a second rectifier having a plurality of grid-controlled thermionic discharge rectifiers, means to couple the input of the said second rectifier to the free secondary of the said second transformer, means to derive a third unidirectional control voltage from the output of the said second rectifier having a time-delayed characteristic, and means to apply the said third unidirectional control voltage to a free direct current control winding of the said first transformer, the magnetomotive forces resultant from the currents supplied to said free and the said one of the direct current control windings of the first transformer, respectively, being opposed.

12. In an electric power supply arrangement adapted to supply direct current to a load, a source of alternating current, a reactor, a first transformer having a magnetically saturable core, a primary, a secondary, first, second and third direct current control windings, means to couple the primary of the said first transformer to the said source of alternating current through the said reactor, a second transformer having a primary, secondary and tertiary windings, a current transformer having primary and secondary windings, means to couple the secondary and primary windings of the said first and second transformers respectively through the primary of the said current transformer, a rectifier, means to couple the secondary winding of the said second transformer to the load through the said rectifier, means to derive a first unidirectional voltage responsive in magnitude to the current through the primary winding of the said second transformer, means comprising a second rectifier coupled to the secondary of the current transformer, means to apply the said derived first unidirectional control voltage to the first direct current control winding of the said first transformer, means to derive a second unidirectional control voltage responsive in amplitude to changes in the magnitude of the alternating current supply source, means to apply said second control voltage to the second direct current winding of the said first transformer, a full wave rectifier comprising a plurality of grid-controlled thermionic discharge rectifiers, means to couple the input of the said full wave rectifier to the tertiary winding of the said second transformer, a unidirectional conductor, a resistance connected in parallel with the said unidirectonal conductor, a capacitance, means to couple said unidirectional conductor and capacitance together in series across the output of the said full wave rectifier, a connection of the junction of the said unidirectional conductor and capacitance to the grid controls of the said thermionic discharge rectifiers, a resistance element having a negative temperature coefficient of resistance, and means to couple the output of the said full wave rectifier to the third direct current control winding of the said first transformer through the said resistance element, the magnetomotive forces resultant from the current supplied to said first direct current control winding being opposed to the magnetomotive forces resultant from the currents supplied to said second and third direct current control windings.

13. In a direct current power supply arrangement having a source of alternating current, a reactor, a first rectifier, a controlled saturable transformer, and means for maintaining the output of the said rectifier at a constant value with changing load, in combination a transformer having a primary connected to the said source of alternating current and a tapped secondary, a first resistance having a non-linear characteristic, a second resistance having a linear characteristic, means to connect the said first and second resistances in series to the ends of the secondary of the said transformer, a second rectifier having its input connected between the secondary tap of the said transformer and the junction of the said first and second resistance, and means to couple the saturable transformer to the output of the said second rectifier.

14. In a direct current power supply arrangement having a source of alternating current, a reactor, a first rectifier, a controlled saturable transformer, and means for maintaining the output of the said rectifier at a constant value with changing load, in combination, a transformer having a primary connected to the said source of alternating current and a tapped secondary, a first resistance having a non-linear characteristic, a second resistance having a linear characteristic, means to connect the said first and second resistances in series to the ends of the secondary of the said transformer, a second rectifier having its input connected between the secondary tap of the said transformer and the junction of the said first and second resistance, and means to vary the magnitude of the said reactor in accordance with the output of the said second rectifier.

15. The combination with a rectifier having input and output terminals for rectifying current supplied thereto from an alternating current supply source and for supplying the rectified current to a load, a saturable transformer comprising a core, a primary, a secondary and a first and second saturating winding, means having impedance for supplying alternating current from said source to said primary winding, means for connecting said secondary winding to said rectifier input terminals, means for connecting said first saturating winding and said load in series to said rectifier output terminals to set up a first magnetomotive force in said core, said first saturating winding and said load having a first common terminal, said rectifier and said load having a second common terminal, a current path comprising said second saturating winding only, and means for connecting the terminals of said current path to said first and second common terminals respectively to set up in said core a second magnetomotive force opposed to said first magnetomotive force.

16. A combination in accordance with claim 15 in which there are provided an inductive reactor and means for supplying current from said alternating-current source through said reactor to said primary winding.

17. A combination in accordance with claim 15 in which said current path comprises temperature responsive resistance means for minimizing load voltage changes due to ambient temperature changes.

18. The combination with a rectifier for rectifying current supplied thereto from an alternating-current supply source and for supplying the rectified current to a load, of a reactor, a saturable transformer comprising a core, a primary, a secondary and a first and second direct-current winding, means for supplying alternating current from said source through said reactor to said primary winding, means for connecting said secondary to the input of said rectifier, means for connecting said first direct-current winding and said load in series to the output of said rectifier, a circuit connected across said load comprising said second direct-current winding only, the magnetomotive forces set up in said core due to the currents in said first and second direct-current windings being opposed, and means for minimizing load voltage changes due to ambient temperature changes comprising a temperature responsive resistance means for controlling the current supplied to one of said direct-current windings.

JAMES A. POTTER.

REFERENCES CITED

The following references are of record in the file of this patent:

UNITED STATES PATENTS

| Number | Name | Date |
|---|---|---|
| 1,650,072 | Jonas et al. | Nov. 22, 1927 |
| 2,082,607 | Amsden | June 1, 1937 |
| 2,322,130 | Hedding | June 15, 1943 |
| 2,373,383 | Christopher | Apr. 10, 1945 |
| 2,503,880 | Mah | Apr. 11, 1950 |